United States Patent [19]

Wilder

[11] 4,435,109

[45] Mar. 6, 1984

[54] DWELL ASSEMBLY BACK SPOTFACE

[75] Inventor: Vernon H. Wilder, Murfreesboro, Tenn.

[73] Assignee: McDonnell Douglas Corporation, Long Beach, Calif.

[21] Appl. No.: 406,055

[22] Filed: Aug. 6, 1982

[51] Int. Cl.³ .............................................. B23B 39/00
[52] U.S. Cl. ..................................... 408/14; 408/129; 408/141
[58] Field of Search ................... 408/14, 15, 132, 129, 408/134, 133, 139, 141, 142; 173/156; 409/231

[56] References Cited

U.S. PATENT DOCUMENTS

| | | | |
|---|---|---|---|
| 1,219,537 | 3/1917 | Dalton | 408/134 X |
| 3,487,729 | 1/1970 | Juhasz et al. | 408/14 |
| 3,762,827 | 10/1973 | Ziegelmeyer | 408/14 |
| 3,767,313 | 10/1973 | Bohoroquez et al. | 408/14 |
| 4,273,481 | 6/1981 | Corley et al. | 408/14 |

Primary Examiner—William R. Briggs
Assistant Examiner—Lawrence Meier
Attorney, Agent, or Firm—John P. Scholl; George W. Finch; Donald L. Royer

[57] ABSTRACT

A dwell assembly back spotface for use with a reverse feed drill to provide an accurate depth of cut together with cutter dwell to insure a clean hole.

5 Claims, 3 Drawing Figures

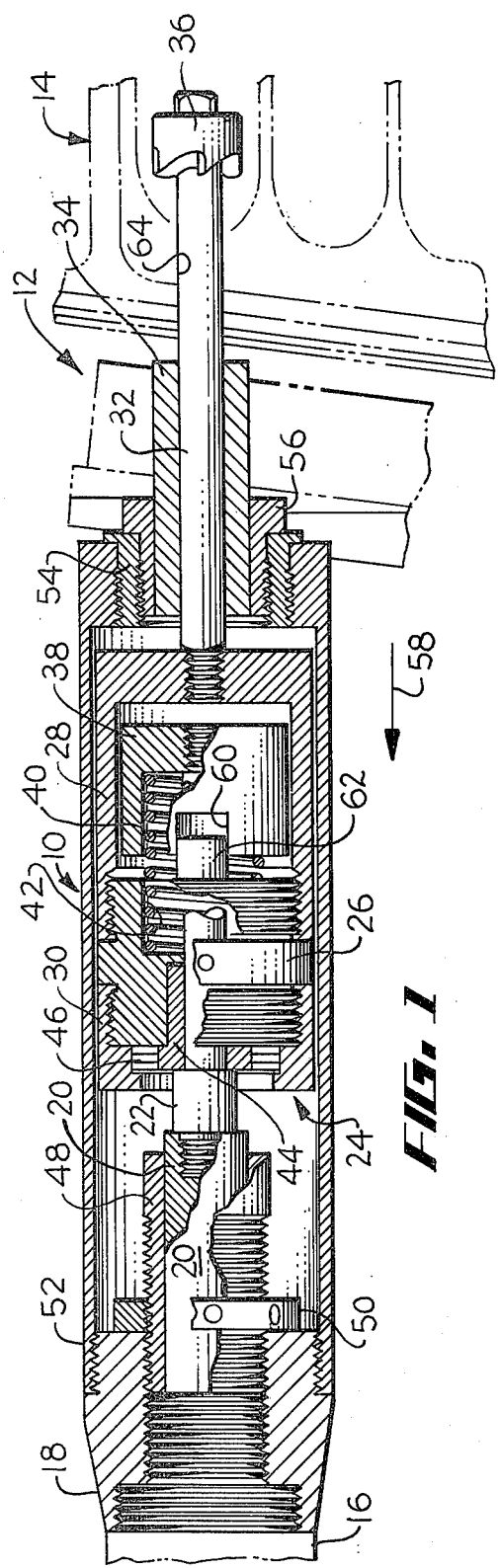
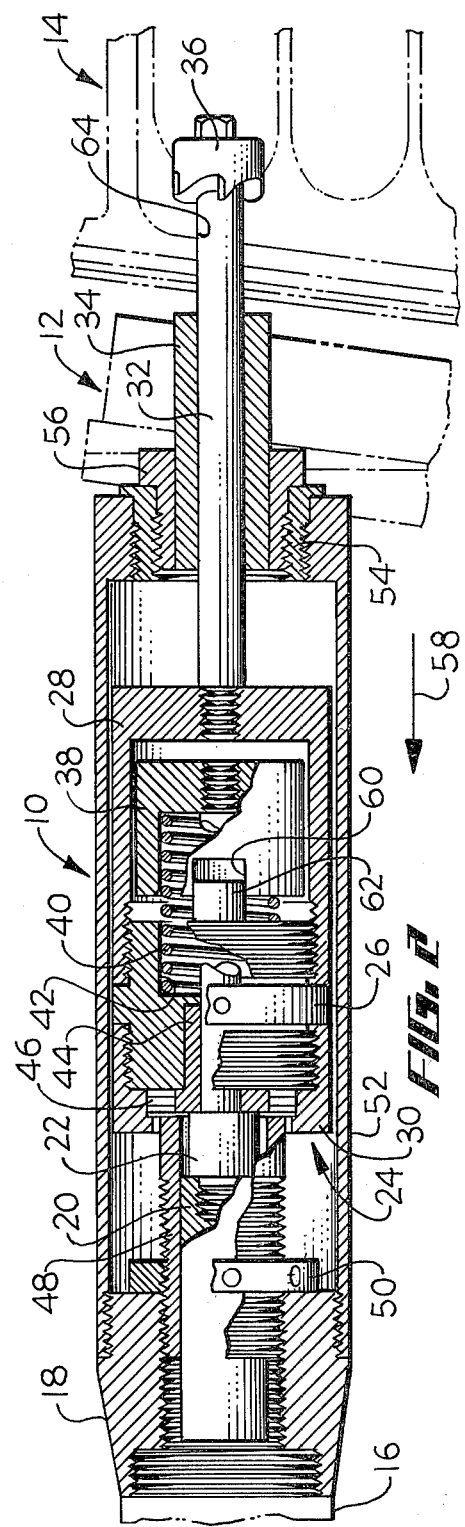

DWELL ASSEMBLY BACK SPOTFACE

BACKGROUND OF THE INVENTION

When manufacturing certain aircraft industrial parts it is desirable, due to the configuration of the part, to have holes cut and countersunk by a reverse feed operation. A standard industry drill for use in such an operation is a Cleco Quackenbush reverse feed drill. This drill is available from the Quackenbush Drill Company, a division of Dresser Industries.

This standard reverse feed Quackenbush drill has a feature that upon completion of a cutting stroke the drill automatically returns the spindle to the starting position, i.e., the beginning of the cutting stroke. The automatic return feature utilized in the Quackenbush drill, however, can only be set to a tolerance of plus or minus 1/16 of an inch (0.0625). In addition, when the automatic return is activated on the Quackenbush drill, the cutter immediately returns to the beginning of the cutting stroke and there is no dwell time for cutter clean up of the hole in the part at the end of the stroke and consequently, the cutter leaves marks on the part.

In the manufacture of diverse aircraft parts the desired tolerance is 0.01 inch and cutter marks may be undesirable and have to be removed in a secondary polishing or grinding step.

SUMMARY OF THE PRESENT INVENTION

The inventive Dwell Assembly Back Spotface provides a positive stop with repeatable accuracy of 0.002 inch. In addition, it provides for cutter dwell following the cutting stroke to clean up the hole. The above actions of the Dwell Assembly Back Spotface are accomplished by having a positive stop located within the assembly which limits the stroke of the cutter spindle within the desired accuracy. A spring loaded collapsible dwell assembly drive permits the Quackenbush drill to continue its stroke turning the cutter spindle so that the cutter can clean up the hole before automatically recycling. This assembly also permits the Quackenbush drill spindle to complete its stroke and automatically return to the start of the cutting stroke without affecting the depth of the cut.

BRIEF DESCRIPTION OF THE DRAWINGS

FIG. 1 depicts a vertical section through the inventive Dwell Assembly Back Spotface which is at first position at the beginning of the cutting stroke;

FIG. 2 shows the Spotface of FIG. 1 following the cutting stroke prior to the dwell stroke.

DETAILED DESCRIPTION OF THE PREFERRED EMBODIMENT

Figure 3:
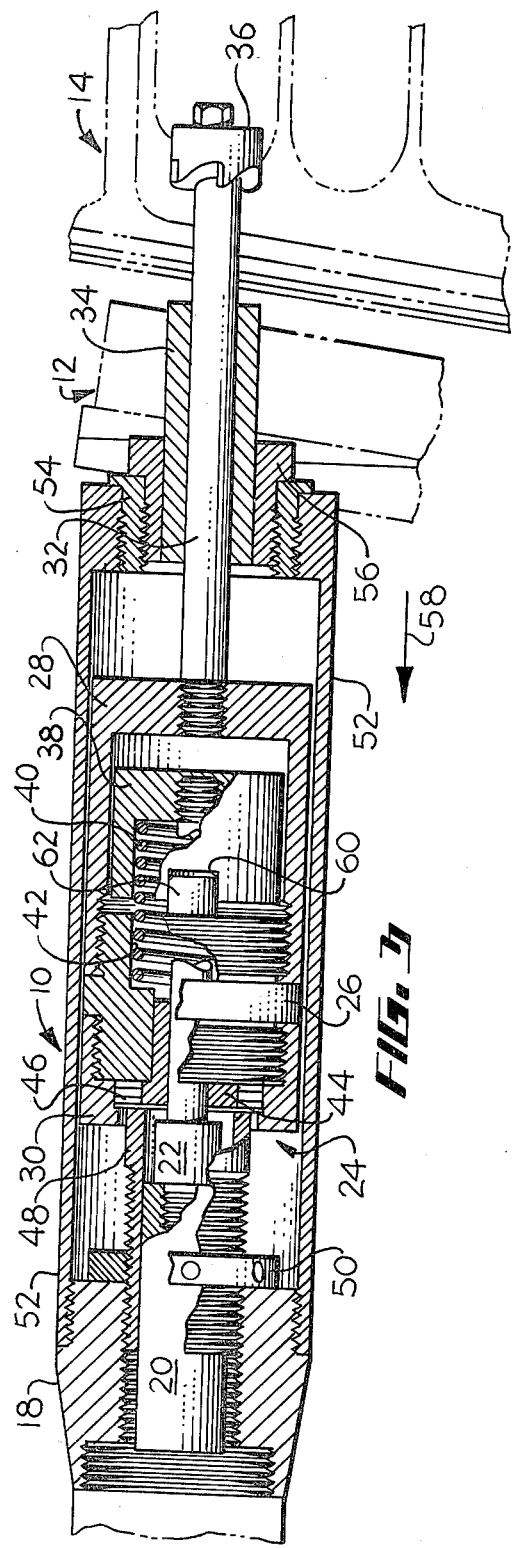
FIG. 3 shows the Spotface of FIGS. 1 and 2 after the dwell stroke prior to returning to first position and beginning of the cutting stroke.

In FIG. 1 the Dwell Assembly Back Spotface 10 is shown loaded into an assembly jig 12 and set up to cut an aircraft part 14 by a reverse feed action.

A reverse feed Cleco Quackenbush drill 16 is threaded onto the backface attachment collar 18 and the Quackenbush drill spindle 20 is threaded onto the backface spindle 22. The spotface assembly drive 24 has a cylindrical flanged body member 26 which is attached by screw threads to the forward interior cylindrical housing 28. A rear cylindrical housing 30 is also threadedly attached to the cylindrical flanged body member 26. The cutter spindle 32 is threaded into the forward interior cylindrical housing 28. The cutter spindle 32 is held in alignment by a forward bushing tip 34. The forward bushing tip 34 attached to the assembly jig 12 by a conventional twist lock bushing such as a United Nurlock Drill Bushing. Once the cutter spindle 32 has been inserted through the hole in part 14, to be back cut and spotfaced, a cutter 36 is attached by a bayonet lock to the cutter spindle 32.

Contained within the forward interior cylindrical housing is a spring housing 38. This spring housing 38 surrounds and holds one end of a coil spring 40. The opposite end of the coil spring 40 is located in a cavity 42 in the cylindrical flanged body member 26. The coil spring 40 surrounds the backface spindle 22 which holds it in proper alignment. The backface spindle 22 is held and guided by backface bushing 44 which is threaded into the flanged body member 26. Attached to the backface bushing is an adjustment sleeve thrust bearing 46 which is surrounded and held in position against the cylindrical flanged body member 26 by the rear cylindrical housing 30.

An adjustment sleeve 48 surrounds and guides the drill spindle 20 and limits the stroke of the backface assembly 24 by abutting the adjustment sleeve thrust bearing 46.

A lock collar 50 is in threaded engagement with the adjustment sleeve 48 and holds the adjustment sleeve 48 in a fixed position in relationship to the attachment collar 18.

An exterior cylindrical casing 52 is threaded into the attachment collar 18 and encloses the spotface assembly drive 24. This casing 52 surrounds and protects the spotface assembly drive 24 while it is rotating. A first collar 54 threadedly engages the cylindrical casing 52. A second front collar 56 threadedly engages the first collar 54 and also holds the forward bushing tip 34. Collar 56 and bushing tip 34 engage assembly jig 12 so that the back spotface 10 may be mounted to match the angle in the assembly jig 12.

Second collar 54 is an adaptor to provide for the use of drill bushing tips with larger or smaller threads. Second collar 54 can be removed completely or can be provided with different size inside diameter threads to match the drill bushing tips.

The part 14 to be machined is held in the assembly jig 12 so that it is fixed in position in relationship to the back spotface 10. The mounting of part 14 in the assembly jig 12 is not shown.

In FIG. 2 the reverse cutting stroke has been completed in the direction of arrow 58. The cutter 36 has moved its maximum distance into the part 14. The cutter stroke is determined by the movement of the spotface assembly drive to the left in the direction of arrow 58 and the engagement of the adjustment sleeve thrust bearing 46 and the adjustment sleeve 48.

As the Quackenbush drill 16 continues its reverse cutting stroke in the direction of arrow 58 (to the left in FIG. 3) the spring housing 38 moves to the left in the direction of arrow 58 to compress coil spring 40. The movement of the spring housing 38 to the left within the forward interior cylindrical housing 28 permits the Quackenbush drill 16 to complete its normal stroke and activate its automatic return to the position of FIG. 1. While the Quackenbush drill 16 is completing its normal stroke the cutter spindle 32 continues to turn but has ceased to advance in the direction of arrow 58. This turning of the cutter spindle 32 and cutter 36 provides cleanup of the hole in the part 14.

The turning action of the Quackenbush drill 16 is transmitted from the drill spindle 20 to the backface spindle 22 to the forward cylindrical spring housing 38. Grooves 60, 180° apart on the circumference of the cylindrical spring housing 38 engage dogs 62 on the flanged cylindrical body member 26 and turn the flanged cylindrical body member 26 and the forward cylindrical interior housing 28. This interior housing 28 turns the cutter spindle 32 to which it is threadably attached. The cutter 36 is attached by a bayonet lock to and turns with the cutter spindle 32. Comparing the position of the dogs 62 in the grooves 60 of flanged body member (FIGS. 2 and 3) the telescoping of the backface assembly drive 24 is apparent. This telescoping movement of spring housing 38 and the flanged body member 26 permits the Quackenbush drill to complete its normal stroke before recycling.

In practice part 14 is loaded into the assembly jig 12. Quackenbush drill 16 is then attached to the Dwell Assembly Back Spotface 10 by threading the drill spindle 20 to the spotface spindle 22. The drill 16 is then threaded onto the backface attachment collar 18. Drill 16 with attached spotface 10 is loaded into the assembly jig 12 with the cutter spindle 32 passing thru a pre-reamed hole 64 in the part 14. Cutter 36 is attached after the cutter spindle is passed through the hole 64 in the part 14. The stroke of the cutter 36 is then set by threading the adjustment sleeve 48 in relationship to the attachment collar 18. This relationship is then fixed by threading lock collar 50 tight against the attachment collar 18.

The normal stroke of the Quackenbush reverse feed drill 16 is approximately 2¼ inches. The desired stroke for the cutter 36 must be less than the Quackenbush drill stroke and within the limits of the drive assembly 24, i.e., the movement of drive assembly 24 within the spotface 10 plus the telescoping engagement of the dogs 62 on the flanged body member 26 and grooves 60 in the forward cylindrical spring housing 38. The Quackenbush drill automatic return should be set to actuate within telescoping engagement of the dogs 62 and grooves 60.

Once the cutter 36 is attached to the cutter spindle 32 the Quackenbush drill 16 is activated and proceeds through its normal automatic cycle. The Dwell Assembly Back Spotface moves from the positions in FIG. 1 to FIG. 2 to FIG. 3 and then recycles to the first position of FIG. 1 along the automatic recycling of the Quackenbush drill. At this point, the cutter 36 may be removed from the cutter spindle 32 and the part may be removed from the assembly jig 12.

While certain exemplary embodiments of this invention have been described and shown in the accompanying drawings, it is to be understood that such embodiments are merely illustrative of, and not restrictive on, the broad invention to the specific desire to be limited in my invention to the specific constructions or arrangements shown and described, since various other obvious modifications may occur to persons having ordinary skill in the art.

What is claimed is:

1. A Dwell Assembly Back Spotface for use with a reverse feed drill having a drill housing and a drill spindle having an axis, which spotface limits the movement of a cutter spindle comprising:

an exterior housing to be attached to the drill housing;
a first spindle attached to the drill spindle;
a spring housing attached to said first spindle;
a central body with means engaging said spring housing to transmit rotational drive and permit relative axial movement between said central body and said spring housing;
a forward housing surrounds said spring housing and is attached to the central body;
a cutter spindle attached to said forward housing;
spring means engaged by said spring housing and by said central body to provide spring biased axial movement between said spring housing and said central body, and
adjustment means attached to said exterior housing to limit the stroke of the cutter spindle where the central body and the spring housing are disposed between said cutter spindle and said adjustment means.

2. The backface of claim 1 wherein the spring means comprises a coil spring surrounding a portion of the first spindle and located between the spring housing and the central body said coil spring being compressed during operation of the backface assembly to provide for a dwell position of said cutter spindle in relationship to said drill spindle.

3. The backface assembly of claim 2 wherein the adjustment means comprises an adjustment sleeve threadably engaging said exterior housing, said adjustment sleeve limits the travel of the central body and therefor the stroke of the backface assembly.

4. The backface assembly of claim 3 wherein the adjustment sleeve is positioned and locked by an adjustment collar and a thrust bearing attached to said central body engages said adjustment sleeve.

5. The backface assembly of claim 4 wherein the rotative telescoping engagement of said central body and said spring housing is provided by dogs located on a central body slidably engaging grooves in said spring housing.

* * * * *